(12) United States Patent
McKenrick

(10) Patent No.: US 6,581,938 B2
(45) Date of Patent: Jun. 24, 2003

(54) FLEXIBLE SEAL FORMING MEMBER

(75) Inventor: Timothy D. McKenrick, Boyertown, PA (US)

(73) Assignee: TDM Industries, Inc., Boyertown, PA (US)

( * ) Notice: Subject to any disclaimer, the term of this patent is extended or adjusted under 35 U.S.C. 154(b) by 0 days.

(21) Appl. No.: 09/861,955

(22) Filed: May 21, 2001

(65) Prior Publication Data

US 2001/0045699 A1 Nov. 29, 2001

Related U.S. Application Data

(60) Provisional application No. 60/206,366, filed on May 23, 2000.

(51) Int. Cl.[7] .................................................. F16L 21/02
(52) U.S. Cl. ....................... 277/314; 277/315; 277/602; 277/605; 277/606; 277/646
(58) Field of Search ................................ 277/312, 314, 277/315, 316, 602, 605, 606, 627, 628, 630, 634, 646

(56) References Cited

U.S. PATENT DOCUMENTS

| | | | | |
|---|---|---|---|---|
| 322,076 A | * | 7/1885 | Hollingsworth | 119/536 |
| 2,306,160 A | * | 12/1942 | Freyssinet | 277/605 |
| 2,816,575 A | * | 12/1957 | Stokes | 138/109 |
| 4,746,127 A | | 5/1988 | Westhoff et al. | |
| 4,790,544 A | | 12/1988 | Kemp | |
| 4,993,722 A | | 2/1991 | Gundy | |
| 5,029,907 A | | 7/1991 | Gundy | |
| 5,511,573 A | * | 4/1996 | Corte | 137/15.08 |
| 5,573,349 A | * | 11/1996 | Paoluccio | 210/170 |
| 5,580,068 A | | 12/1996 | Gundy | |
| 5,901,962 A | | 5/1999 | Wambeke | |

FOREIGN PATENT DOCUMENTS

| | | |
|---|---|---|
| DE | 3728009 | 2/1989 |
| EP | 0372963 | 12/1989 |

* cited by examiner

Primary Examiner—Anthony Knight
Assistant Examiner—Enoch E Peavey
(74) Attorney, Agent, or Firm—Volpe and Koenig, P.C.

(57) ABSTRACT

A seal apparatus including an elongated body formed of a resilient expandable material defining an interior chamber and having a longitudinal axis. The elongated body is capable of being rolled up on itself by rolling one of the first and second ends of the elongated body in a direction parallel to the longitudinal axis. At least one stem is attached to the elongated body and is in fluid communication with the interior chamber.

13 Claims, 8 Drawing Sheets

FLEXIBLE SEAL FORMING MEMBER

CROSS REFERENCE TO RELATED APPLICATION

This application claims the benefit of U.S. Provisional Application No. 60/206,366, filed May 23, 2000, entitled "Inlet Seals" which is hereby incorporated by reference herein in its entirety as if fully set forth.

BACKGROUND

The present invention relates generally to seals for pipes and, more specifically, to a flexible seal forming member capable of sealing a pipe within an opening of an object.

Pipes used with storm water run off systems often terminate within a concrete catch basin. Collected storm water is transferred through a pipe and into the catch basin. In preparing a storm water system, the installation and maintenance of a proper seal between the pipe and the catch basin is critical. When a pipe is inserted into a hole in a catch basin, a gap is typically present between the pipe and the catch basin. Such gaps can be sealed using concrete or bricks and mortar which is an extremely time consuming process. Additionally, after installation and back filling of the basin is completed, there is a potential for leakage around the area between the pipe and the catch basin because the seal between the catch basin and the pipe tends to degrade when the catch basin is back filled. Additional factors such as extended use, aging, digging around the pipe and ground settling may shift the position of the pipe with respect to the catch basin causing leakage between the pipe and the catch basin.

Alternatively, pipes can be sealed to walls using a bulkhead fitting, such as that commonly used in sumps. However, to properly attach a pipe to a bulkhead fitting, the pipe should be oriented generally perpendicularly to the wall supporting the bulkhead. Thus, the use of bulkhead fittings typically requires more careful laying of pipe resulting in increased costs.

The above methods of sealing a pipe within an object can be problematic when used with polymeric pipes. Polymeric pipes often have multiple spaced apart longitudinal ridges located along the outer pipe surface to increase pipe rigidity and to provide the necessary pipe strength. In such pipes, grooves are present between the longitudinal ridges that make it difficult, at best, to establish an effective seal around the polymeric pipe.

What is desired, but has not yet been provided by the conventional art, is a method for sealing a pipe to an object and a seal apparatus that is easy to install between a pipe and an object, that allows for a pipe to be askew from perpendicular to the surface in which the pipe is sealed, that is effective at providing seals between objects and plastic pipes having spaced apart longitudinal ridges along the outer surface, and that is easy to remove and reinstall to simplify repairs.

SUMMARY

One embodiment of the present invention is directed to a method for sealing a pipe within an opening. The method includes: providing an object having an opening forming an inner surface; positioning a pipe having an outer surface through the opening resulting in a gap between at least a portion of the outer surface of the pipe and the inner surface of the object; positioning a flexible member around at least a portion of the pipe and at least partially in the gap, the flexible member being expandable; and filling the flexible member with a pressurized agent to expand the flexible member forming a seal between the pipe and the object.

Another embodiment of the present invention is directed to a seal apparatus including an elongated body formed of a resilient expandable polymeric material defining an interior chamber and having a longitudinal axis. The elongated body is formed by two panels and has first and second ends. The elongated body is capable of being rolled up on itself by rolling one of the first and second ends of the elongated body in a direction parallel to the longitudinal axis. At least one stem is attached to the elongated body and is in fluid communication with the interior chamber.

BRIEF DESCRIPTION OF THE DRAWINGS

The foregoing summary, as well as the following detailed description of the preferred embodiment of the present invention, will be better understood when read in conjunction with the appended drawings. For the purpose of illustrating the invention, there is shown in the drawings an embodiment which is presently preferred. It is understood, however, that the invention is not limited to the precise arrangement and instrumentality shown. In the drawings.

DETAILED DESCRIPTION OF THE PREFERRED EMBODIMENTS

Figure 1:
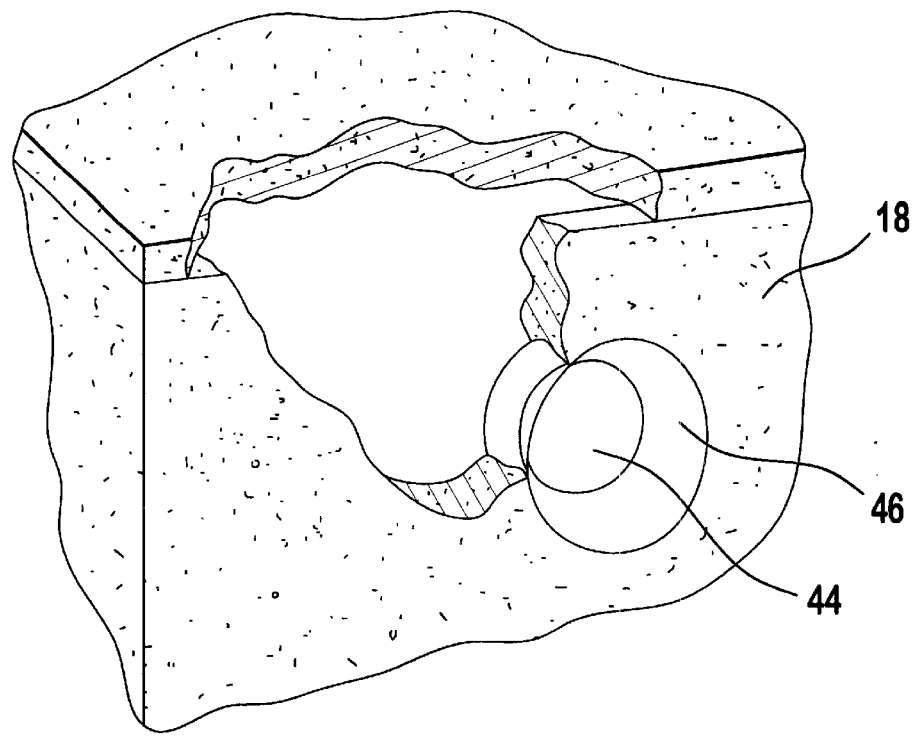
FIG. 1 is a broken away view of a catch basin having a wall defining an opening therein.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the seal apparatus and designated parts thereof. The terminology includes the words above specifically mentioned, derivatives thereof and words of similar import. The word "object" means "any one of a catch basin, a wall, another pipe, a tank or the like." Additionally, the word "a" as used in the claims and in the corresponding portions of the specification means "at least one."

Referring to the drawings in detail, wherein like numerals indicate like elements throughout, FIGS. 2–10 illustrate a flexible member according to the preferred embodiment of the present invention, generally designated 10. Briefly speaking, the flexible member 10 provides a durable, quick installation seal between a pipe 12 and an object 18, such as a catch basin 14 for a storm water management system. The flexible member 10 is positionable in a gap 20 between the pipe 12 and the object 18 and can be expanded using a pressurized agent to fill the gap 20 and seal the pipe 12 in the object 18.

Figure 2:
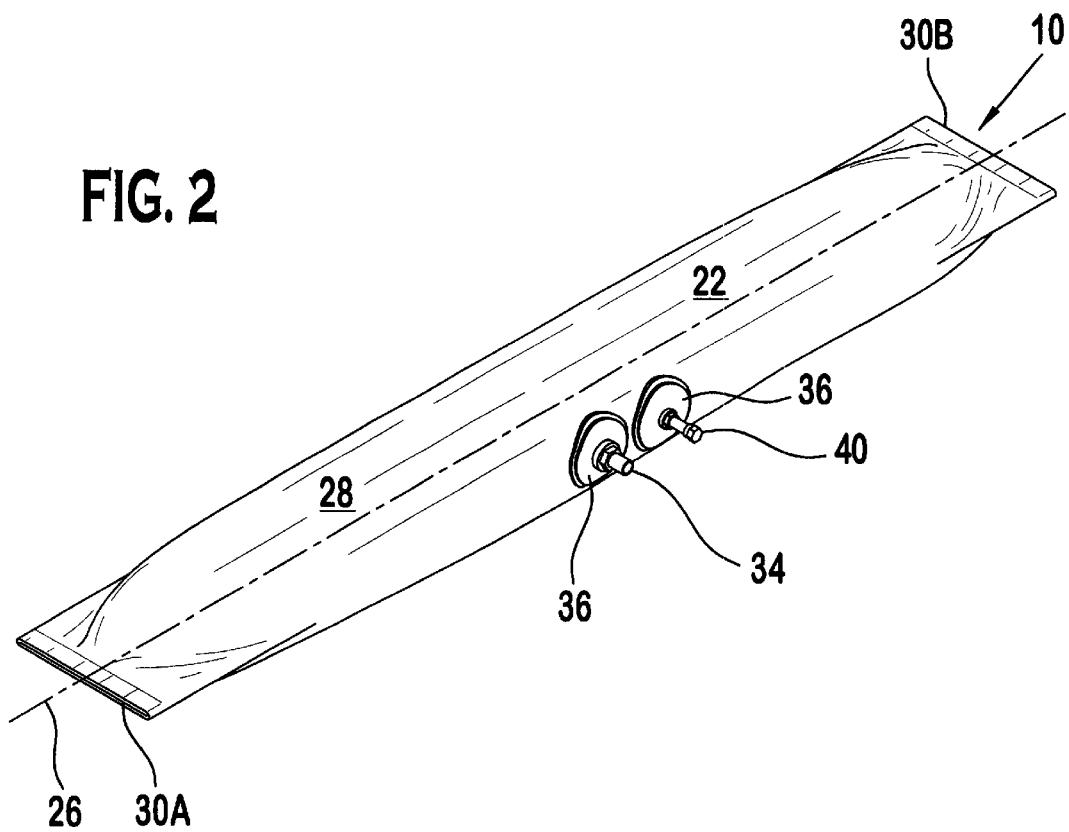
FIG. 2 is a perspective view of a flexible member according to the preferred embodiment of the present invention wherein the flexible member is partially expanded.
Figure 4:
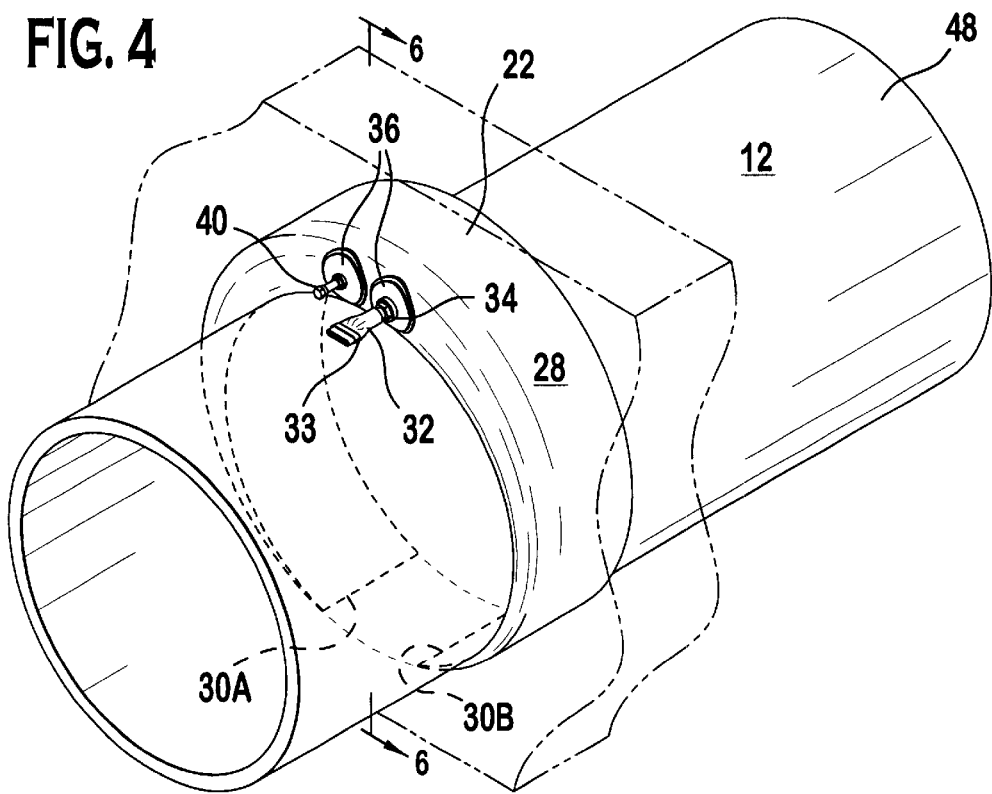
FIG. 4 is a perspective view of the flexible member of FIG. 2 inflated and disposed around at least a portion of a pipe extending through an object (shown in phantom lines) illustrating one preferred configuration of the flexible member when it is disposed between a pipe and another object.
Figure 5:
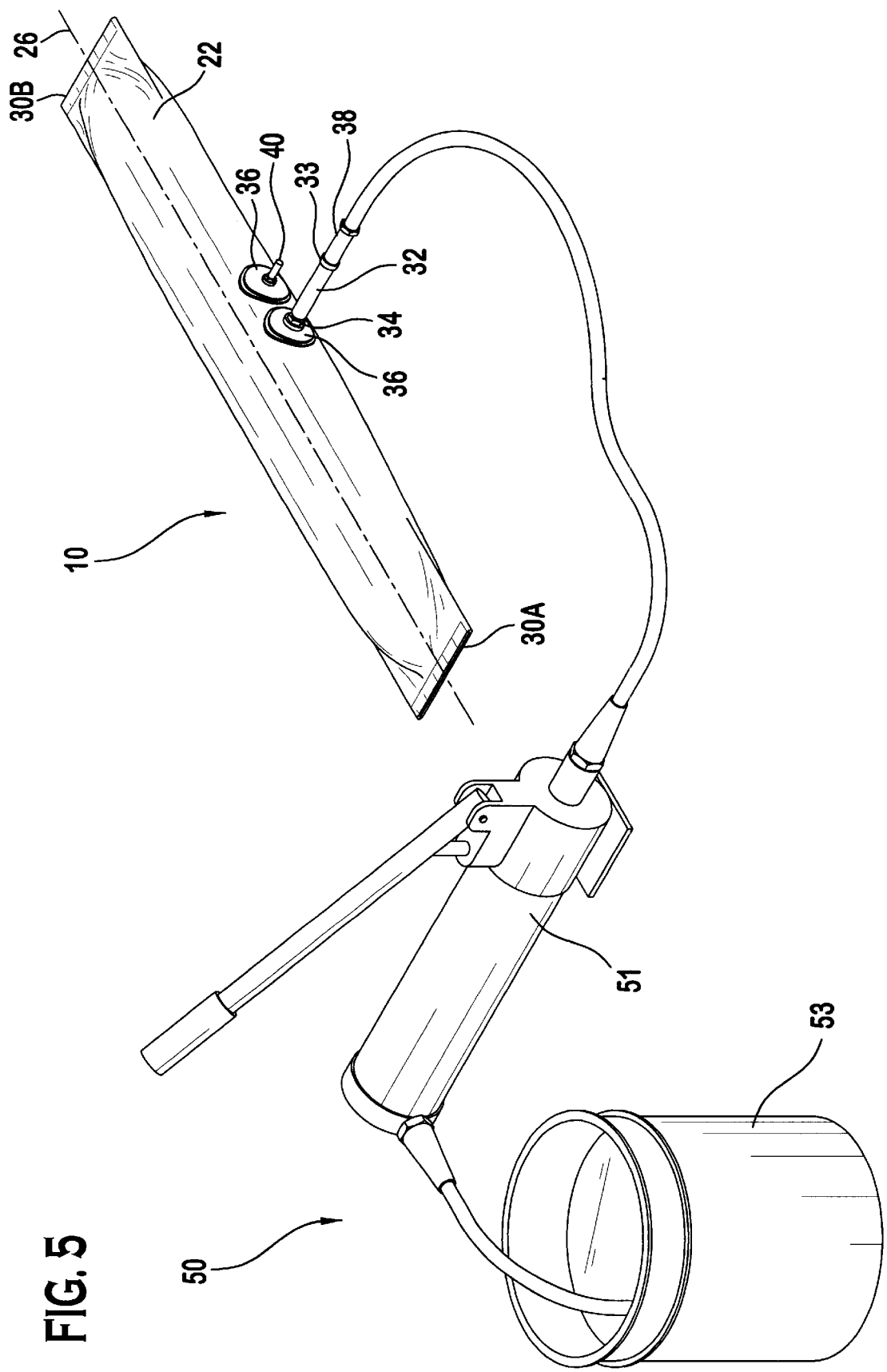
FIG. 5 is a perspective view of a filling system in fluid communication with the flexible member of FIG. 2.

As best shown in FIGS. 2, 4 and 5, the flexible member 10 preferably has an elongated body 22 formed of a resilient expandable material defining an interior chamber 24 (shown in FIG. 6) and having a longitudinal axis 26. The elongated body 22 is preferably formed by two panels 28 and has first and second ends 30A, 30B. It is preferred that the flexible member 10 be formed by an approximately seventy (70) durometer hardness EPDM, neoprene or the like. However those of ordinary skill in the art will appreciate from this disclosure that other materials, such as rubber (such as those used in roofing material), suitable synthetics, suitable polymeric materials or the like, can be used without departing from the scope of the present invention.

Figure 6:
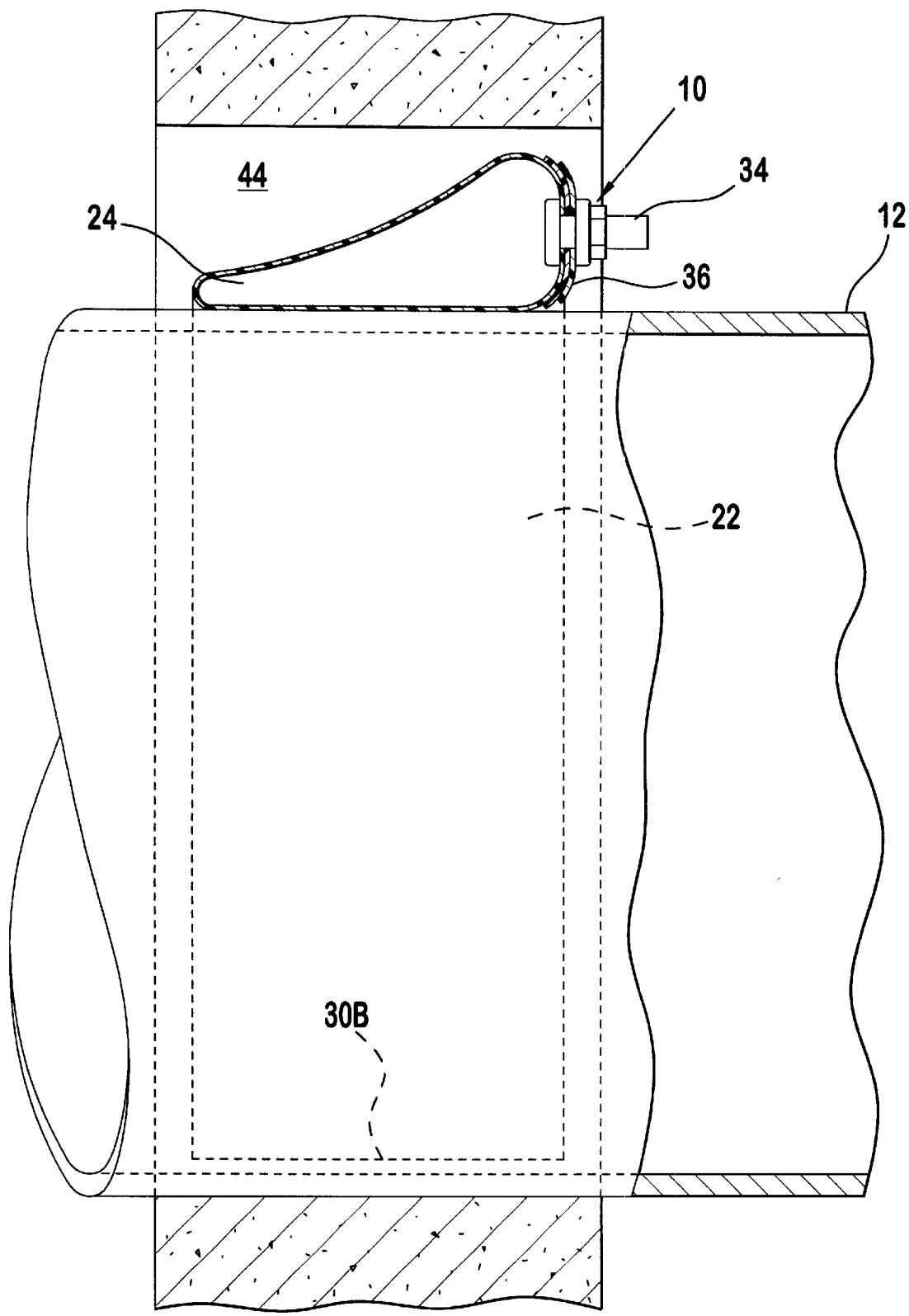
FIG. 6 is a partial cross-sectional view of the flexible member of FIG. 2 partially expanded and positioned in a gap between the pipe and the object.

Referring to FIG. 6, it is preferable that each panel 28 have a thickness between approximately three (3) millimeters and approximately seven (7) millimeters, more preferably about five (5) millimeters. However, those of ordinary skill in the art will appreciate from this disclosure that, depending on the application, other thicknesses can be used without departing from the scope of the present invention. It is preferable, but not necessary that the material used to form the panels 28 has tear resistance of between approximately one hundred (100) pounds per square inch and two hundred (200) pounds per square inch.

The length and width of the flexible member 10 depends upon the specific application for which the flexible member 10 is to be used. One preferred width is approximately five (5) inches, but the width can vary depending on the desired application. The elongated body 22 is preferably formed of a rectangular piece of material that is folded along a line extending the entire length thereof to form the panels 28. Then, the flexible member 10 is sealed using a heat sealing process, gluing, stitching or any other known suitable sealing procedure. The folded material that forms the two panels 28 is further sealed at the first and second ends 30A, 30B in a similar manner. Depending upon the method used to seal the perimeter of the elongated body 22, the flexible member 10 can be cut to a suitable size at a job site and appropriately sealed along the edges of the two panels 28.

Figure 7:
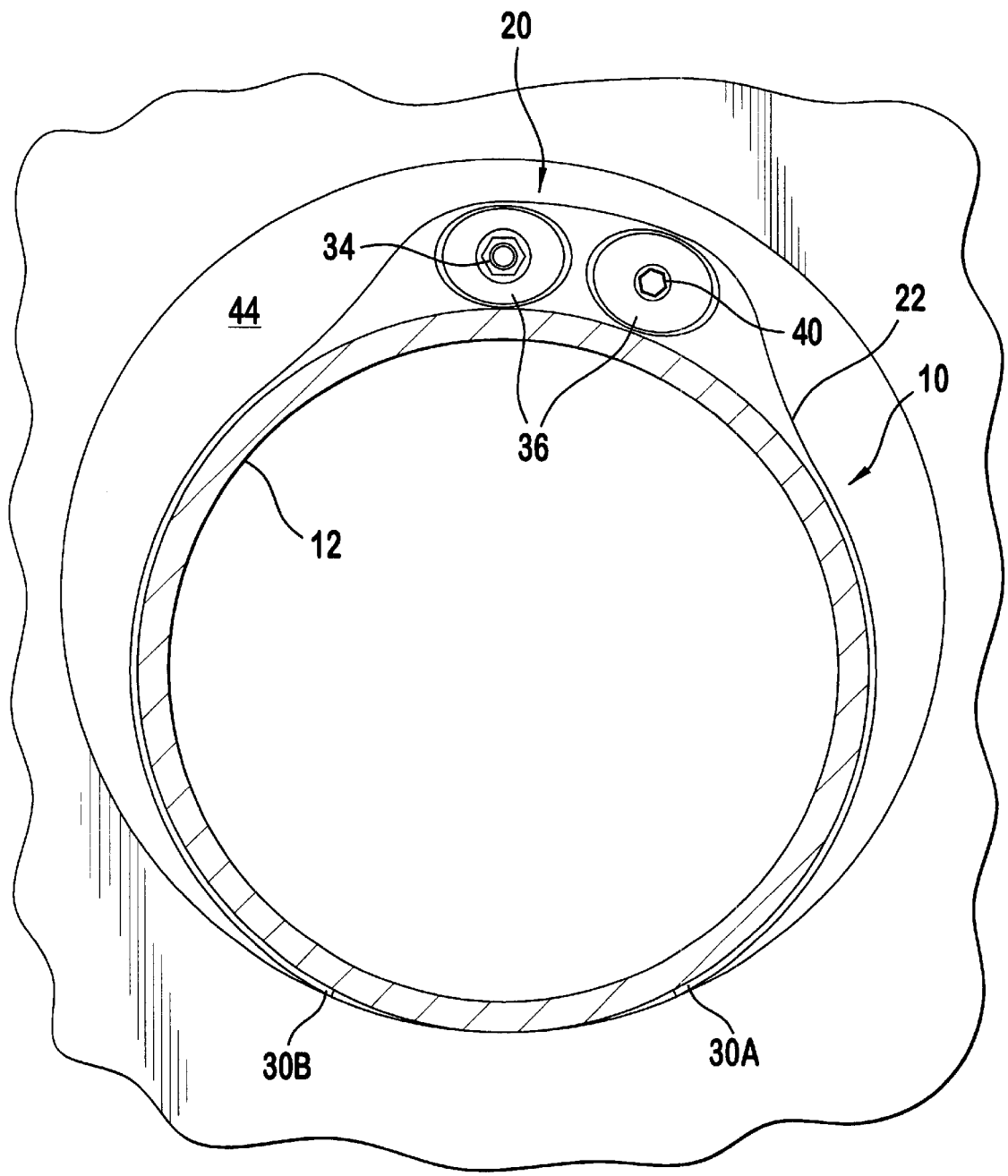
FIG. 7 is an elevational view of the flexible member of FIG. 2 partially expanded and inserted between the pipe (shown in cross-section) and the object.

The elongated body 22 is capable of being rolled up on itself by rolling one of the first and second ends 30A, 30B of the elongated body 22 in a direction parallel to the longitudinal axis 26. As best shown in FIGS. 2, 6, and 7, at least one stem 34 is attached to the elongated body 22 and is in fluid communication with the interior chamber 24. The inner diameter of the stem 34 is selected depending on the pressurized agent that is used to fill the flexible member 10. The stem 34 is preferably formed from a strong, durable material, such as brass, aluminum, alloy, a rigid polymer or the like, and is sized for insertion into a nozzle 38 of the filling system 50. Referring to FIG. 5, to attach the filling system 50 to the stem 34, the nozzle 38 of the filling system is pushed over the stem 34 to form a friction fit. Those of ordinary skill in the art will appreciate from this disclosure that the stem 34 can be positioned at any point on the body 22 without departing from the scope of the present invention. The preferred filling system 50 uses a manual pump 51 that is in fluid communication with a reservoir 53 containing the pressurized agent. However, an automated pump (not shown) can be used without departing from the present invention.

Referring to FIG. 4, the preferred method of sealing the flexible member 10 after the flexible member 10 has been expanded by the pressurized agent, is to compress a crimp ring 33 along a portion of the preferably polymeric nozzle forming a nozzle segment 32 that is friction fit to the stem 34. The nozzle segment 32 is then cut from the nozzle 38 and the stem 34 is sealed. The stem seal is maintained by the friction fit between the nozzle segment 32 and the stem 34 and by the crimped end of the nozzle segment 32.

Figure 9:
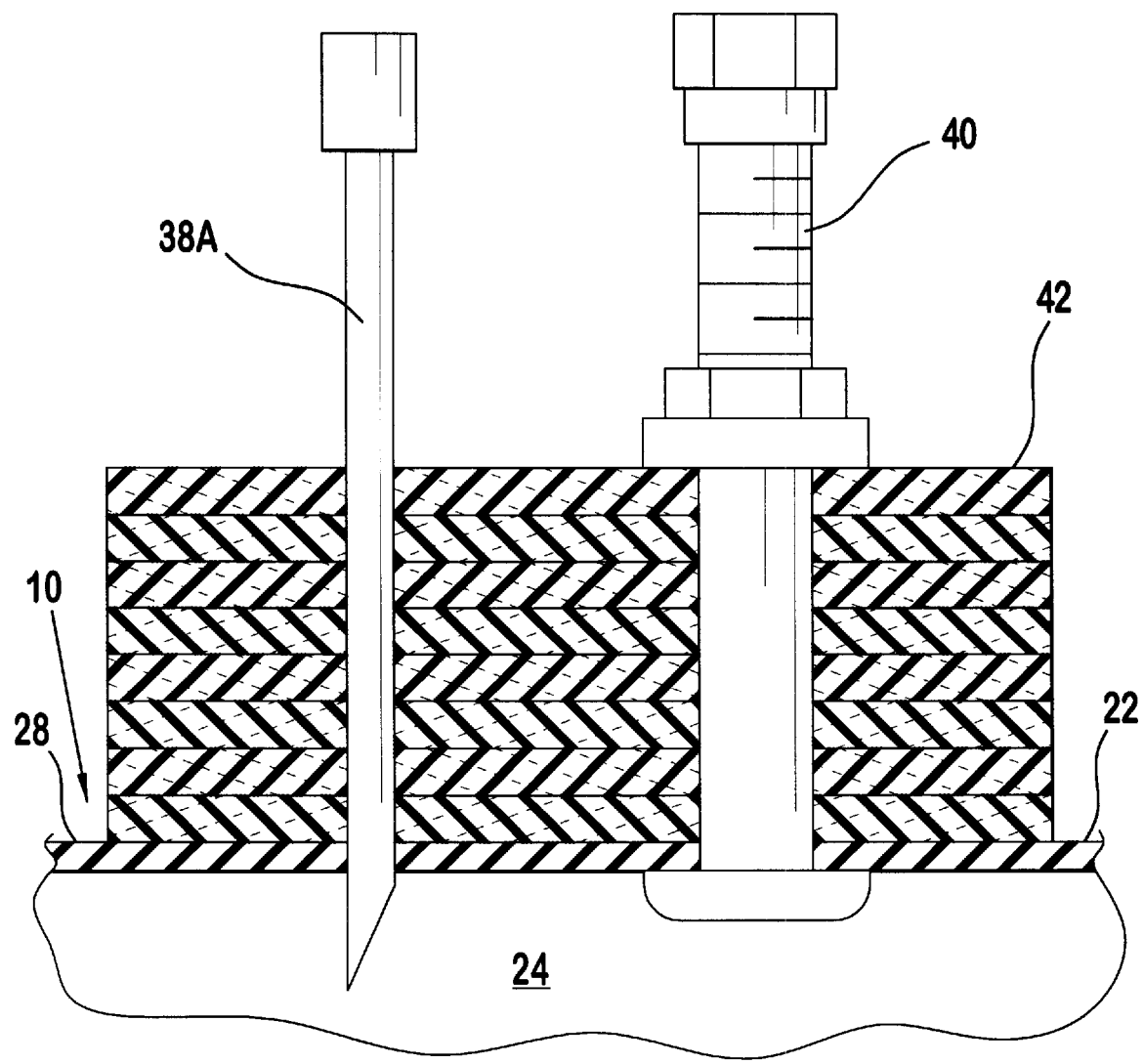
FIG. 9 is a partial cross-sectional view of the flexible member of FIG. 2 with a multi-layered patch thereon.

Alternatively, referring to FIG. 9, a layered polymeric patch 42 can be used to fill the flexible member 10. It is preferable that alternating layers of the multi-layered patch 42 have a grain pattern, such as that found in rubber roofing material that is produced by tire manufacturers, extending in different directions. The multi-layered patch 42 allows a piercing nozzle 38A (which is attached to the filling system 50) to be inserted into the flexible member 10 via the multi-layer patch 42. When the flexible member 10 is suitably expanded, the piercing nozzle 38A is withdrawn from the multi-layered patch 42 which prevents the pressurized agent from leaking from the flexible member 10 due to the varied fiber directions in the different patch 42 layers. Depending on the pressurized agent used to expand the flexible member 10 various seals, such as a one way valve similar to that on automobile tires, can be used without departing from the scope of the present invention.

Figure 10:
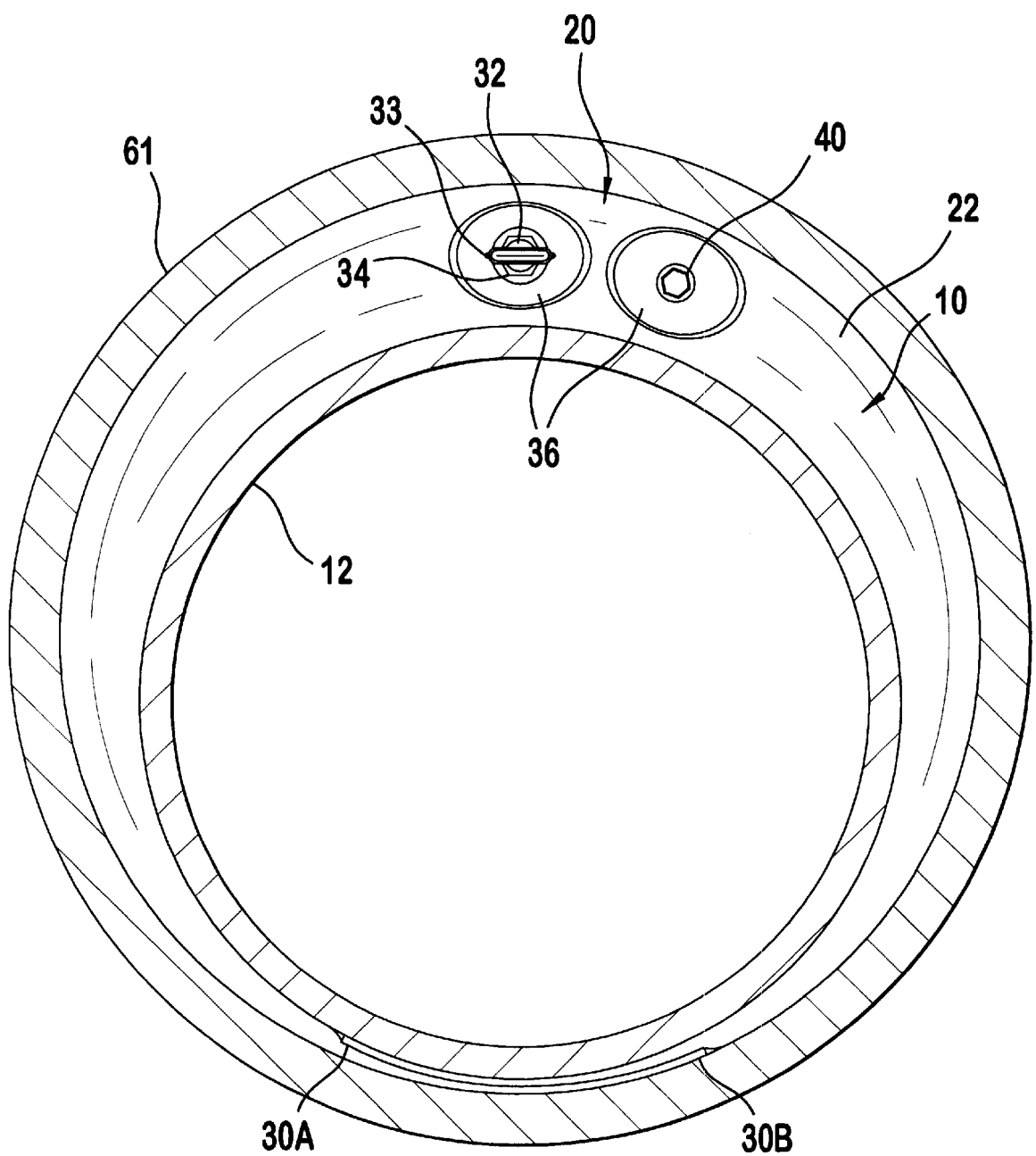
FIG. 10 is an elevational view of the flexible member of FIG. 2 expanded to form a seal between two pipes (shown in cross-section).

As best shown in FIGS. 7 and 10, the stem 34 is preferably surrounded by a reinforcement section 36. The reinforcement section 36 is preferably, but not necessarily, formed by another layer of material that can be similar to that used to form the body 22 of the flexible member 10, in a generally circular fashion around the stem 34.

Referring to FIGS. 6 and 7, the stem 34 is used to inflate the flexible member 10 after the flexible member 10 has been properly positioned around the pipe. Due to the flexible characteristics of the flexible member body 22, the flexible member 10 can expand to conform with the outer surface of the pipe 12 and the opening 44 in an object 18. Thus, the flexible member 10 is ideally suited for use with polymeric and plastic pipes having multiple spaced apart reinforcing ridges extending longitudinally along an outer surface. The flexible nature of the body 22 allows the flexible member 10 to efficiently and quickly form a seal inside the grooves between the external pipe ridges commonly found on polymeric or plastic pipes. Similarly, the flexible member 10 is effective at sealing irregularly shaped pipes within irregularly shaped openings.

Figure 8:
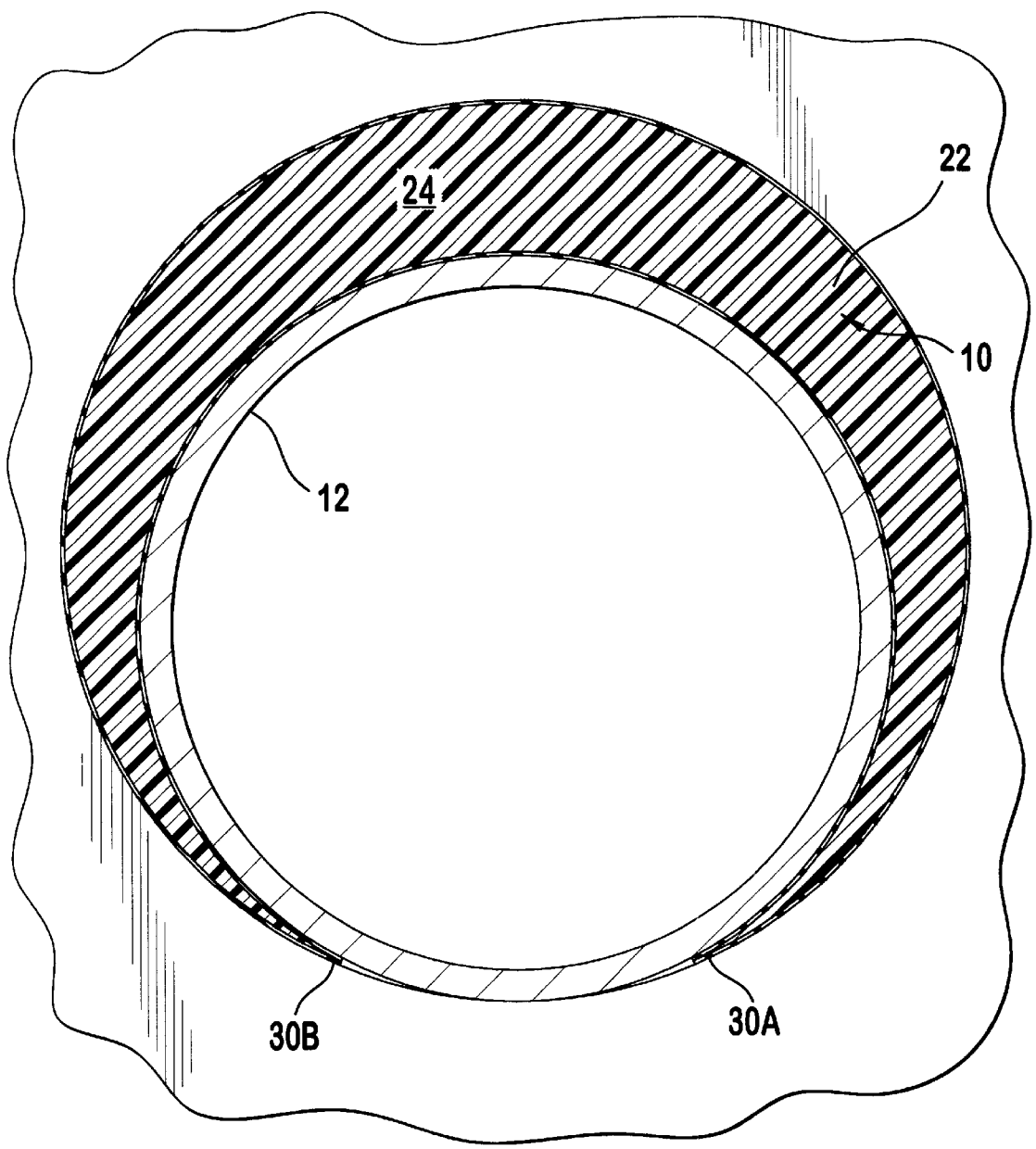
FIG. 8 is a cross-sectional view of the flexible member of FIG. 2 expanded to seal the pipe (shown in cross-section) within the opening of the object.

Referring to FIGS. 4, 8 and 10, it is preferable that the pressurized agent used to expand the flexible member 10 is a modified environmentally friendly tire sealant. The tire sealant preferably includes water crystals that absorb moisture to aid in curing the pressurized agent such that, after curing, holes in the elongated body 22 will not result in leaks that can cause the flexible member to shrink which would degrade the seal between the pipe 12 and the object 18.

Repairs to the flexible member 10 are rare due to the preferable gel-like properties of the preferred pressurized agent. It is also preferable, but not necessary, that the sealant further harden when exposed to air causing the flexible member 10 to be self-sealing when a tear occurs in the elongated body 22. Alternatively, air, silicone, suitable gel mixtures, liquids, or viscus materials may be used, under pressure, to expand the flexible member 10 without departing from the scope of the present invention. It is preferred that the flexible member 10 be filled until the interior chamber 24 holds a pressure of between approximately four (4) pounds per square inch and approximately twenty (20) pounds per square inch. More preferably the interior chamber 24 is filled to hold a pressure between approximately five (5) pounds per square inch and approximately ten (10) pounds per square inch. However, those of ordinary skill in the art will appreciate that the flexible member 10 can be expanded to hold other pressures depending upon the construction of the flexible member 10 without departing from the scope of the present invention.

As best shown in FIGS. 2, 7 and 10, it is preferred, but not necessary, that the flexible member 10 include a second stem 40, attached to the elongated body 22, that is in fluid communication with the interior chamber 24. It is preferable that the second stem 40 provide an air release to simplify the filling of the elongated body 22 with the pressurized agent. Alternatively, the second stem 40 could comprise an emergency relief valve to compensate for excessive pressure in the flexible member 10. While the second stem 40 is preferably generally centrally located along the length of the elongated body 22, those of ordinary skill in the art will appreciate from this disclosure that the second stem 40 can be positioned at any point along the elongated body 22 without departing from the scope of the present invention.

Referring to FIGS. 2 and 5, it is preferable that the flexible member 10 has a generally rectangular shape when uninflated and disposed on a generally flat surface. However, those of ordinary skill in the art will appreciate from this disclosure that the elongated body 22 can have a generally elliptical, trapezoidal, or irregular shape when uninflated and disposed on a generally flat surface without departing from the scope of the present invention.

Figure 3:
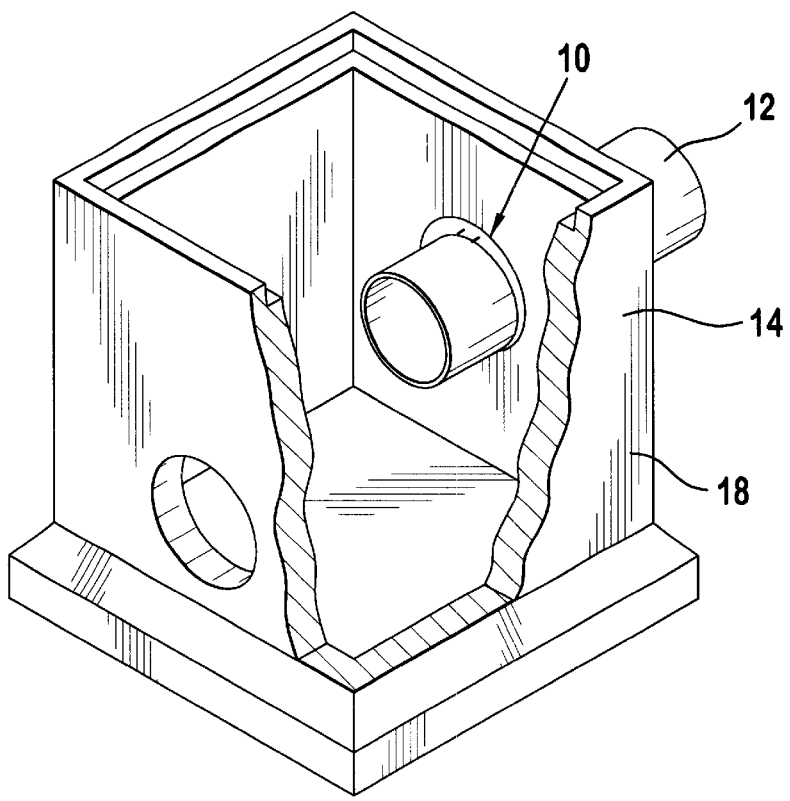
FIG. 3 is a broken away perspective view of the flexible member of FIG. 2 disposed between a pipe and the catch basin.

Referring to FIG. 4, the method of the present invention is directed to sealing a pipe 12 within an opening 44 and includes the step of providing an object 18 having an opening 44 forming an inner surface 46. Referring to FIG. 3, it is preferred, but not necessary, that the object 18 is a wall in a catch basin 14 for a storm water system. However, those of ordinary skill in the art will appreciate from this disclosure that the object 18 can be any other structure having an opening 44 capable of receiving the pipe 12.

As best shown in FIGS. 6 and 7, the method of the present invention preferably includes positioning a pipe 12 having an outer surface 48 through the object opening 44 resulting in a gap 20 between at least a portion of the outer surface 48 of the pipe 12 and the inner surface 46 of the object 18. The opening 44 is preferably generally circular in shape. However, those of ordinary skill in the art will appreciate from this disclosure that a triangular, rectangular, or irregular shaped opening 44 can be used without departing from the scope of the present invention. The gap 20 preferably has a generally crescent shape due to the circular shape of the pipe 12 and the opening 44 when the pipe 12 rests on an edge of the opening 44. However, referring to FIG. 10, those of ordinary skill in the art will appreciate that when the inner pipe 12 is not supported on a side of the opening 44, that the inner pipe 12 can be generally centrally positioned within the opening 44 to allow the gap 22 to extend entirely around the pipe 12 without departing from the scope at the present invention.

In one preferred embodiment, the object 18 is a wall forming part of a temporary storm water holding tank and the flexible member 10 is positioned around a pipe 12 in fluid communication with the tank. Additionally, a second pipe end is preferably in fluid communication with a grate opening to a ground surface.

The method of the present invention preferably, but not necessarily, includes the step of placing an adhesive on the inner surface 46 of the object 18 prior to inserting the flexible member 10 therein. The method also preferably includes the placing of adhesive on the outer surface of the pipe 12 prior to positioning the flexible member 10 thereover. The adhesive used with the flexible member 10 is preferably non biodegradable and water resistant. When using adhesive, the first method of the present invention includes allowing the adhesive to cure while maintaining the flexible member 10 in an expanded position (as shown in FIG. 8).

The method of the present invention includes positioning the flexible member 10 around at least a portion of the pipe 12 and at least partially in the gap 20. Depending upon the location of the pipe 12 within the opening 44, the flexible member 10 can be disposed about an entire circumferential portion of the pipe 12. The flexible member 10 is expandable to fill the gap 20. Those of ordinary skill in the art will appreciate from this disclosure that the step of positioning the flexible member 10 around the pipe 12 may include wrapping the flexible member 10 around the pipe 12 more than once.

Referring to FIG. 5, the method of the present invention can include the step of filling the flexible member 10 with a pressurized agent to expand the flexible member 10 and form a seal between the pipe 12 and the object 18. When using a viscous material, such as concrete or grouting, to fill the flexible member 10, the first method of the present invention preferably includes the steps of filling the flexible member 10 with the viscous material under pressure and allowing the viscus material to cure and harden to form a solid plug. The flexible member 10 then serves as a gasket between the pipe 12 and the solid plug and also serves as a gasket between the solid plug and the object 18.

The method of the present invention can include removing at least a portion of the pressurized agent from the flexible member 10 and removing the flexible member 10 from the gap 20 to allow a user to perform one of the steps of repairing the pipe 12, replacing the pipe 12, repairing the flexible member 10, and replacing the flexible member 10. Once the necessary repairs or replacements have been made, an operator repositions the flexible member 10 around the pipe 12 and, if necessary, refills the flexible member 10 to reestablish the seal between the pipe 12 and the object 18. When the flexible member 10 is inserted between two pipes (as opposed to between a pipe and a wall), the flexible member 10 can be removed to repair or replace either of the pipes. When the flexible member 10 is used as a pipe reducer between a first and second pipe, two flexible members 10 can be used without departing from the scope of the present invention. The two flexible members 10 can be installed sequentially to further prevent leakage by forming a double seal.

Referring to FIGS. 1–10, the present invention operates as follows. A pipe 12 is inserted through an opening 44 in an object 18 forming a gap 20 between the pipe 12 and the object 18. The flexible member 10 is inserted in the gap 20 between at least a portion of the outer periphery of the pipe 12 and the object 18. The first valve stem 34 is connected to a nozzle 38 of a filling system 50 to expand the flexible member 10 to fill the gap 20 using a pressurized agent.

During the filling process the second stem 40 can be used to allow air to evacuate from the elongated body 22. After the flexible member 10 has been expanded, the nozzle 38 is removed from the elongated body 22 and the flexible member 10 forms a seal between the pipe 12 and the object 18.

It is recognized by those skilled in the art, that changes may be made to the above-described embodiment of the invention without departing from the broad inventive concept thereof. It is understood, therefore, that this invention is not limited to the particular embodiment disclosed, but it is intended to cover all modifications which are within the spirit and scope of the invention as defined by the appended claims.

What is claimed is:

1. A method for forming a non-temporary watertight seal between a pipe and a wall, comprising:

providing the wall forming part of a storm drainage system, the wall bearing an opening forming an inner surface;

positioning the pipe having an outer surface through the opening resulting in a gap between at least a portion of the outer surface of the pipe and the inner surface of the wall;

positioning a flexible member around at least a portion of the pipe and at least partially in the gap such that the flexible member does not overlap itself, the flexible member being expandable and including a layered polymeric patch thereon, the flexible member comprising at least one polymeric material and is configured to have an interior chamber, the flexible member including at least one stem positioned through the layered polymeric patch and being in fluid communication with the interior chamber;

filling the flexible member with a with a viscous material under pressure to expand the flexible member forming a watertight seal between the pipe and the wall; and allowing the viscous material to cure and harden to form a non temporary solid plug wherein the flexible member serves as a gasket between the pipe and the solid plug and serves as a gasket between the solid plug and the wall to form the watertight seal.

2. The method of claim 1, further comprising the step of gluing the flexible member in position.

3. The method of claim 1, wherein the flexible member is filled using pressurized air.

4. The method of claim 1, wherein the flexible member is filled with a sealant.

5. The method of claim 1, wherein the step of positioning the pipe further comprises positioning a pipe that is in fluid communication with a grate opening to a ground surface.

6. The method of claim 1, wherein the flexible member is filled using a pressurized fluid.

7. The method of claim 1, wherein the flexible member has a generally rectangular shape when uninflated and disposed on a generally flat surface.

8. The method of claim 1, further comprising the step of placing an adhesive on the inner surface of the object prior to inserting the flexible member therein.

9. The method of claim 8, further comprising the step of placing the adhesive on the outer surface of the pipe prior to positioning the flexible member thereover.

10. The method of claim 9, further comprising the step of allowing the adhesive to cure while maintaining the flexible member in an expanded condition.

11. A seal apparatus, comprising:

an elongated body formed of a resilient expandable material defining an interior chamber and having a longitudinal axis, the elongated body being formed by two panels and having first and second ends, the elongated body is capable of being rolled up on itself by rolling one of the first and second ends of the elongated body in a direction parallel to the longitudinal axis; and at least one stem attached to the elongated body and in fluid communication with the interior chamber.

12. The seal apparatus of claim 11, further comprising a reinforcement section disposed around the at least one stem and the second stem.

13. The seal apparatus of claim 11, wherein the elongated body has a generally rectangular shape when uninflated and disposed on a generally flat surface.

* * * * *

UNITED STATES PATENT AND TRADEMARK OFFICE
CERTIFICATE OF CORRECTION

PATENT NO. : 6,581,938 B2
DATED : June 24, 2003
INVENTOR(S) : Thomas D. McKenrick It is certified that error appears in the above-identified patent and that said Letters Patent is hereby corrected as shown below:

Column 8,
Line 28, after "apparatus,", insert -- for forming a watertight non-temporary seal between a pipe and an opening in a wall, --.
Line 35, after "axis", delete "; and" and insert -- , the elongated body including a layered polymeric patch thereon; --.
Line 36, after "stem", delete "attached to" and insert -- positioned through the layered polymeric patch and through --.
Line 36, after "and", insert -- being --.
Line 37, after "chamber", insert -- ; and
     a second stem positioned through the layered polymeric patch and through the elongated body and being in fluid communication with the interior chamber --.

Signed and Sealed this

Third Day of January, 2006

JON W. DUDAS
*Director of the United States Patent and Trademark Office*